United States Patent [19]
van Staveren

[11] 4,093,501
[45] June 6, 1978

[54] FRICTIONAL HEAT WELD

[75] Inventor: Dirk Adriaan van Staveren, Moerkapelle, Netherlands

[73] Assignee: N. V. Technische Maatschappij Marchand-Andriessen, Rijswijk, Netherlands

[21] Appl. No.: 730,329

[22] Filed: Oct. 7, 1976

[30] Foreign Application Priority Data
Oct. 10, 1975 Netherlands .......................... 7511929

[51] Int. Cl.² .............................................. B32B 31/20
[52] U.S. Cl. ...................... 156/580; 156/73.5; 156/512; 156/517; 228/2; 264/68
[58] Field of Search ....................... 156/73.5, 580, 512, 156/517; 228/112, 2; 264/68

[56] References Cited
U.S. PATENT DOCUMENTS

| | | | |
|---|---|---|---|
| 3,554,845 | 1/1971 | Billett et al. | 156/73.5 |
| 3,669,799 | 6/1972 | Vikins et al. | 156/73.5 |
| 3,970,491 | 7/1976 | Pezarro | 156/73.5 |

Primary Examiner—Edward G. Whitby
Attorney, Agent, or Firm—Barnes, Kisselle, Raisch & Choate

[57] ABSTRACT

A method and apparatus of connecting the ends of a strap of thermoplastic material wrapped about a package comprising, winding a strip from a supply about a package, separating the strap from the supply to define two ends and a free end connected to the supply, positioning the ends in overlapping relation, interposing the said free end between the overlapping ends, applying a pressure force to the two ends and a relative tractive force longitudinally to the free end to create heat until the free end is removed and the two ends are fused to one another.

5 Claims, 7 Drawing Figures

FRICTIONAL HEAT WELD

This invention relates to an improved method for the mutual connection of two strips of a thermoplastic material to be located adjacent each other with a face towards each other, in that the strips at the place of overlap are held pressed onto each other with a certain force, at least one of the strips is immovably held in its place and the connection is effected by frictional heat, generated during one single shifting by a tractive force to be exerted strokewise on the strip to be shifted, at a place remote over a certain strip length from the place of overlap, the strip being formed by strap ends, e.g. of a strap loop to be wound around a package and both strap ends being held immovably in their places and, before the strap ends are pressed onto each other, a separate strap portion of a similar thermoplastic material as that of the strap ends to be connected, is positioned between these strap ends and the said separate strap portion, under the exertion of the tractive force, is entirely removed from the place of overlap, according to Netherlands patent application No. 73,17.632 filed in Applicant's name on Dec. 21, 1973.

The improvement consists therein, that the said separate strap portion is formed by the separated strap portion, wound in the loop around the package extending beyond the place of overlap and leading to the strap supply.

The advantage obtained with the improvement is that a strap portion can be used for the strap to be pulled away which is entirely similar to the strap ends of the strap loop and which, owing to the single use, is not subject to wear and tear. In a method and device according to Netherlands patent application No. 75,02.847 filed in Applicant's name on Mar. 11, 1975, a separate reinforced strap portion, e.g. of a thermoplastic material reinforced with glass beads, is used, which strap portion is strokewise pulled away entirely from the place of overlap in transverse direction from between the two longitudinally directed strap ends, clamped upon each other, of the strap loop laid around a package. After a certain period of use it appeared that the strap to be pulled away was strongly subjected to wear and tear.

In a further method according to the invention, the strap ends forming the loop, before the strap portion leading to the strap supply is separated, are mutually clamped, seen in the direction of supply of the strap just beyond the welding place proper and, after it has been separated from the clamped strap end, the strap portion leading to the strap supply is longitudinally inserted between the strap and held tensioned around the package and the untensioned strap end extending from the clamping place.

The invention also comprises a device for effecting the method, provided with a longitudinally split platform for the support of a package to be tied round and to be put transversely over the slot, an upper die below the platform, to be shifted to and fro transversely to the slot, a strap tying round mechanism, rotatably positioned in a plane vertical to the platform extending through the slot, having a strap clamp which initially is beside the upper die in said plane below the platform for gripping the strap end of the strap leading to the strap supply present at the other side below the platform and for putting the tying round strap in a loop, extending through the slot, around the package, a cutting mechanism to sever the strap end leading to the strap supply, a lower die movably guided up and down in said plane, as well as a pulling away mechanism, adapted to engage with a certain force, a certain strap length removed from the place of overlap, the strap portion leading to the strap supply, said device being characterized in that, in the plane through the slot, at the side of the strap supply, a device which can be driven by a cam shaft, is arranged to initially feed the strap end of the strap portion leading to the strap clamp in said plane along the lower side of the upper die, that a strap guide U-shaped in cross section, is displaceable along the lower side of the upper die from a position behind said plane to a position in said plane and, furthermore, a guide adapted to oscillate in said plane against the pressure of a spring, is arranged at the frame to guide the strap end of the strap portion leading to the strap supply via the strap guide, in its foremost position, that at said guide, before the welding die provided with a knife, seen in the direction of supply of the strap portion, in said plane behind the welding die, a separate pressure die is movable up and down and that, seen in said direction, before the welding die, a die with a counter knife, is movable up and down in a way restricted by a stop at the guide, with the intermediary of a base onto which the cam shaft is active, all this in such a way that, in the position displaced to the rear of the strap guide, during the moving upwards of the base, first the die presses the one strap end into the strap clamp being, after the tying round of the strap, at the side of the upper die, and the other strap end connected with the strap portion leading to the strap supply against the upper die, then the die, after the gradual swinging upwards of the strap guide, abuts against the stop and then briefly thereafter the welding die, moving along with the knife, separates the strap portion leading to the strap supply from the other strap end clamped by the die and supports the same, whereupon the separated strap portion, with accelerated swinging upwards of the strap guide, by pressing of the pin against the spring and by the drive of the supply device, by the cam shaft is inserted into the notch between the two strap ends are briefly thereupon, the three strap portions are clamped against the upper die by means of the welding die, whereupon the pulling away mechanism is actuated to remove the strap portion strokewise from the overlap.

Preferably cup springs are positioned between the base and the die in the device according to the invention.

The invention will be elucidated herebelow by means of an embodiment diagrammatically represented in the drawing.

Figure 1:
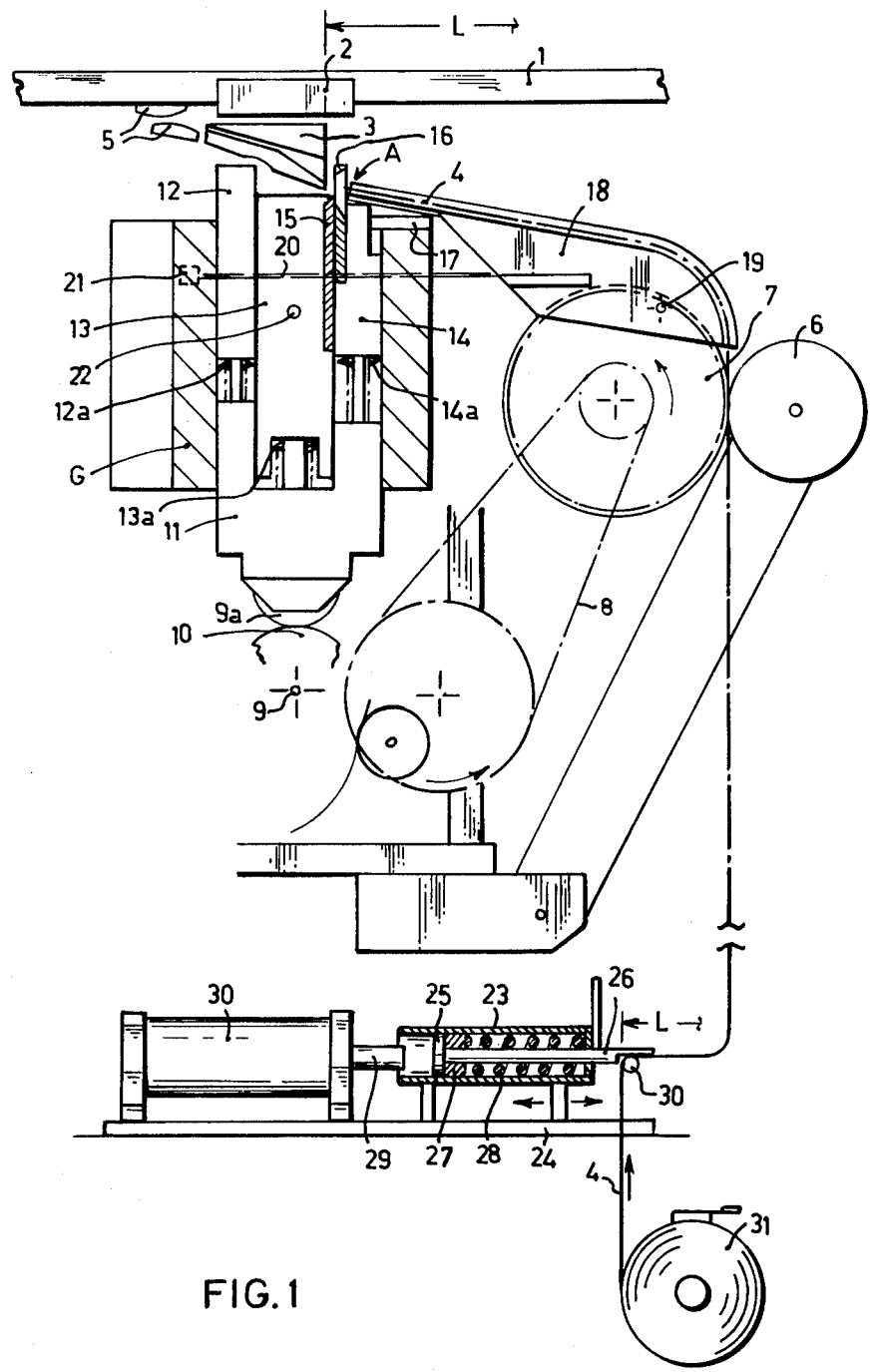
FIG. 1 is a representation of the device which is diagrammatically represented.

The device represented in FIG. 1, which is provided in the usual way with a platform split longitudinally according to the plane of the drawing, for the support of a package, not represented, to be put transversely over the slot, has a support plate or upper die 2, which can be displaced from a position in which the slot is not covered by it from below, in which position the tying round strap can be laid in a loop around the package according to the plane of the drawing, to a position, in which the slot is covered by the upper die, which position is represented in FIG. 1.

The upper die 2 and the strap guide 3 have been displaced forwardly and the above-mentioned slot is closed, the strap guide 3 bridging the distance between the strap portion 4, leading away from the strap stock 31 cut at A after the preceding tying round, and the opened strap clamp 5, present in the plane of the drawing through the slot, in the initial position of the tying round cycle.

Figure 2:
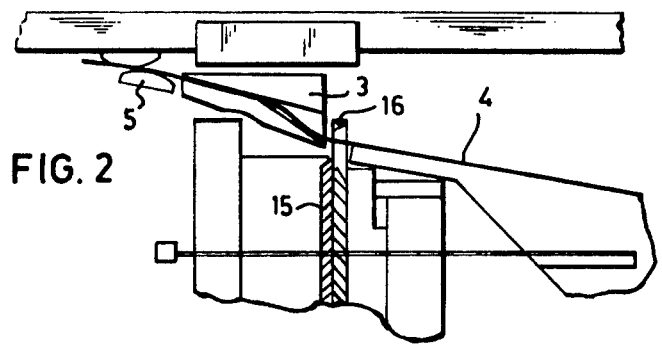
FIG. 2 shows the way in which the strap portion leading to the strap supply is fed to the strap clamp.

The strap portion 4 —being the one strap end— now (see also FIG. 2) is shifted by the strap guide 3, to the strap clamp 5 between a pressure roller 6 and a conveyor roller 7, which by a toothed belt gear, generally indicated by 8, is driven by the cam shaft 9. The strap guide 3 (see FIG. 3) is displaced to the rear over a certain distance and the strap clamp 5 is closed. Then the pressure roller 6 (see FIG. 1) is released from the conveyor roller 7. The tying round mechanism of the strap clamp 5 — formed, inter alia, by a not represented internally toothed gear wheel, extending downwards partially through the slot in the plane of the drawing and surrounding the package from a distance, on which gear wheel the strap clamp is fixed — is driven by a separate motor and is stopped, after substantially one entire revolution, in which the strap is laid around the package in a loop, whereupon the one strap end with the strap clamp 5 is in the represented position (see FIG. 3).

The composite die 12, 13, 14 is moved upwards by a support roller 9a at the base 11 and the untensioned cup shaped spring 12a, 13a and 14a, respectively (see FIG. 1) by the cam 10 of the cam shaft 9, the die 12 pressing the strap portion 4 leading to the strap supply and the said one strap end, clamped in the strap clamp 5, against the upper die 2. (FIG. 3).

Figure 3:
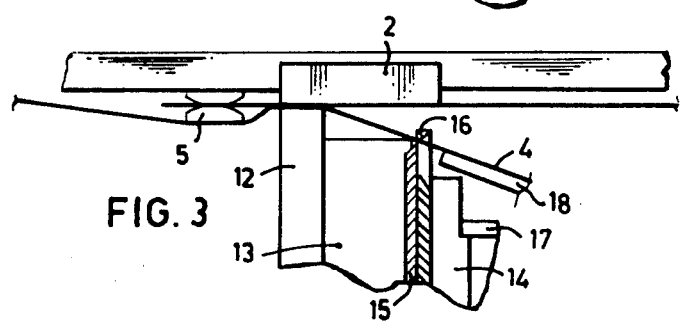
FIG. 3 shows the way in which the one clamped strap and adjacent the welding place is pressed against the upper die with insertion of the strap portion leading to the strap supply.

The die 13 forming the lower die or welding die proper, with the knife 15 attached thereto and the die 14 with the counter knife 16 attached thereto, have been moved upwardly simultaneously with the die 12 (see FIG. 3). During the further upward movement of the base 11, the die 12 being pressed further against the upper die 2 by the cupshaped springs 12a, after covering a short distance, the die 14 with the counter knife 16 is retained by a stop 17, attached to a fixedly arranged guide G to be used for the base 11 and the dies 12, 13, 14. During the further upward movement of the base 11, the die 12 then is pressed further again against the upper die 2 by the cupshaped springs 12a and the die 14 is pressed further against the stop 17 by the cupshaped springs 14a whereas the die 13 is moving further upwards until the strap portion 4, leading to the strap supply, is cut by cooperation of the knife 15 and the counter knife 16, which takes place rather soon after the clamping by the die 12 (see FIG. 3), the separated strap end being supported on the upper face of the die 13.

The strap guide 18 is rotatable, on the one hand, around a shaft 19 and bears, by means of a leaf spring 20, on a small clamping block 21, which is rotatably supported at the guide G. The strap guide 18 initially is moved upwardly by the die 14, then moved further upwardly acceleratedly by contact with a pin 22 at the welding die 13. The oscillating movement of the strap guide 18 is necessary to bring the just separated strap portion 4 upwards for insertion thereof between the strap ends and also, in order to prevent swinging upwards or abutting thereof against the counter knife 16.

Figure 4:
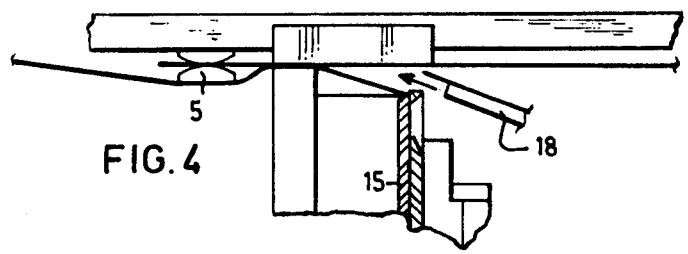
FIG. 4 shows the way in which the strap portion leading to the strap supply is separated from the other strap end and then inserted into the space between the two strap ends.
Figure 5:
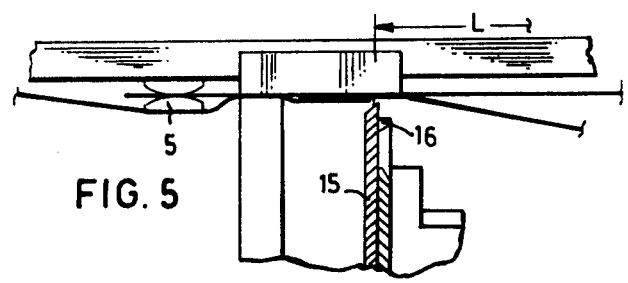
FIG. 5 shows the way in which the three strap portions are pressed against the upper die by the lower die.

The strap portion 4 (see FIG. 4) is shifted through the strap guide 18 between the clamped one strap end and the free other strap end, which is effected by pressing the strap end 4 via the roller 6 against the conveyor roller 7 from the toothed belt gear 8 and the cam shaft 9. Simultaneously, the welding die 13 has moved further upwardly and clamps the strap ends and the strap portion 4 onto each other with a clamping pressure, to be exerted by the cupshaped springs 13a.

Figure 7:
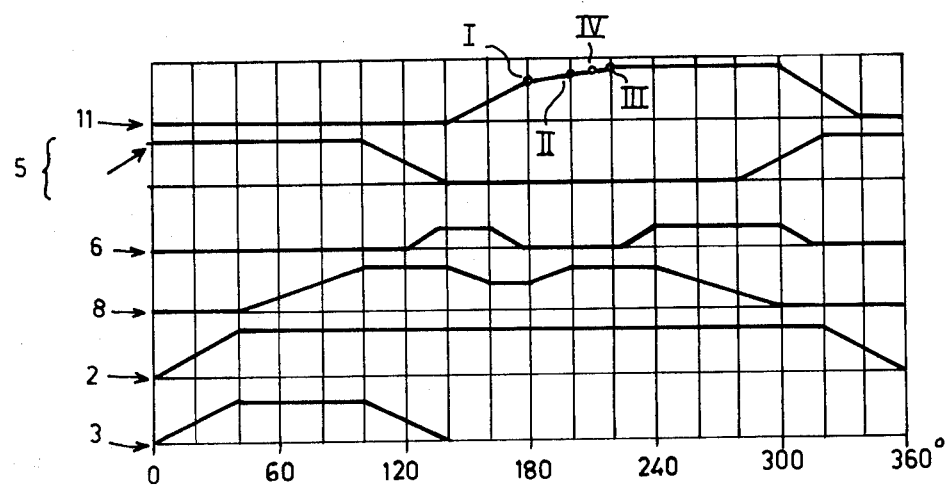
FIG. 7 represents a cam diagram.

In connection with what is said above reference is made, for the sake of clearness, to a cam diagram, represented in FIG. 7, in which, for the movement of the die base 11, the die 12, at point I, is pressed against the upper die 2, the die 14, at point II, abuts against the stop 17, the welding die 13, at point III, presses against the upper die and the strap end, at point IV, is separated from the strap portion 4 leading to the strap supply.

Figure 6:
FIG. 6 shows the way in which the welding between the strap ends takes place by the pulling away entirely of the strap portion leading to the strap supply.

As appears from FIG. 1, the strap portion 4 (see also FIG. 6) extends by the strap guide 18, vertically downwards free from pressure roller 6, to the pulling mechanism for the pulling away entirely of the strap portion 4 from between the two strap ends, which mechanism again is represented diagrammatically. This pulling away mechanism corresponds with the pulling away mechanism as represented in FIG. 3 of Netherlands patent application No. 73,17.632 filed in Applicant's name on Dec. 21, 1973, so that a concise description thereof suffices here.

A cylindrical vessel 23 has been arranged at a vertical support 24 aligned with its axis in the elongation of the strap portion 4. Within this vessel a piston 25 is movable substantially without friction, an axially directed tie rod 26, connected with the piston, extending outwards through an opening in the bottom of the vessel. In the space between the piston 25 and the bottom of the vessel, a strong helical spring 28 has been located free from the wall of the vessel and the tie rod 26, a washer 27 being inserted. By means of a pressure rod 29 of an air cylinder 30, arranged in the elongation of the tie rod 26 and extending through the opening of the vessel 23, the helical spring can be tensioned, it being possible, if desired, to modify the spring tension by using washers having a different axial dimension.

The tie rod 26 has a semi-cylindrical section at the end 29 against the flat surface of which a clamping roller 30, bearing vertically adjustable at the tie rod (which adjustment has not been shown) can be firmly pressed by means of a screw damp. The strap supply is present on a reel 31.

The surfaces of the upper die 2, the die 12 and the welding die 13, preferably are provided with a rubber layer, not shown, for a better grip on the strap end. A certain "stretching length" L is chosen for the distance between the place of overlap of the clamped strap portions (see FIGS. 1 and 6) at the welding die 13 and the clamping place at the roller 30 of the pulling away mechanism.

The spring 28, pretensioned to a certain force K, is released by means of a pawl mechanism, now shown, whereupon the tie rod 26 and therewith the strap end 4, are once pulled away strokewise from between the clamped strap ends and the strap ends are welded together by means of the clamping pressure and generated frictional heat.

It is noted that the use of a strap guide and a, in this case, stationary strap guide to guide a separate strap portion to be pulled away entirely from between the strap ends of a tying round strap, is described in Netherlands patent application No. 75,028.47 filed in Applicant's name on Mar. 11, 1975.

What is claimed is:

1. A device for connecting the ends of a strap of thermoplastic material wrapped about a package comprising
    a platform for supporting the package having a longitudinal vertical slit,
    a strap supply,
    an upper die,
    a lower die,
    a cutting mechanism for severing a strap wrapped about a package to form two ends and a free end on said strap supply,
    means for moving the upper and lower dies relative to one another to force the two ends of said strap wrapped about a package toward one another,
    means for inserting the free end of said strap supply between the two ends of said strap wrapped about said package,
    and means for moving said free end longitudinally of said two strap ends when the two strap ends and said free end are forced together by said means for moving said upper and lower dies together.

2. The device set forth in claim 1 including a strap clamp arranged below said slit and adjacent said dies for gripping the leading end of a strap wrapped about a package.

3. The device set forth in claim 2 including a strap guide for guiding said leading end to said strap clamp, said strap guide being reciprocably movable between a position below said slit and a piston aside thereof.

4. The device set forth in claim 3 including
    a guide mounted adjacent said dies for oscillating movement and yieldingly urged in one direction to guide the free end of the strap formed by cutting toward the dies.

5. The device set forth in claim 4 wherein said lower die comprises an assembly of a welding die,
    a pressure die, a knife, a counter knife,
    means for yieldingly mounting said welding die, pressure die and the knife and counter knife for movement relative to one another such that after said strap guide has been moved aside of said slit during the moving upward of the lower die assembly, first the pressure die presses the strap ends after the wrapping around the package against the upper die, then the knife and counter knife moving with the welding die and the die separate the strap leading to the strap supply said die having been retained by a stop to form the free end, whereupon the separated free end with accelerated swinging upwards of the strap guide is inserted between the two strap ends and briefly thereupon,
    the two strap ends and free strap ends are clamped against the upper die by the welding die,
    whereupon the means for applying longitudinal force is actuated to remove the free end strap portion strokewise from the overlap.

* * * * *